US007739309B2

(12) United States Patent
Singh et al.

(10) Patent No.: US 7,739,309 B2
(45) Date of Patent: Jun. 15, 2010

(54) METHOD, SYSTEM, AND COMPUTER-READABLE MEDIUM FOR MERGING DATA FROM MULTIPLE DATA SOURCES FOR USE IN AN ELECTRONIC DOCUMENT

(75) Inventors: Sumi N. Singh, Redmond, WA (US); Juraj Gottweis, Bellevue, WA (US); John E. Dimmick, Jr., Carnation, WA (US); Tara M. Kraft, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 513 days.

(21) Appl. No.: 10/955,433

(22) Filed: Sep. 30, 2004

(65) Prior Publication Data

US 2006/0075323 A1 Apr. 6, 2006

(51) Int. Cl.
  *G06F 17/20* (2006.01)
  *G06F 15/16* (2006.01)
(52) U.S. Cl. .................. 707/802; 707/803; 707/805
(58) Field of Classification Search .......... 707/802, 707/803, 805
  See application file for complete search history.

(56) References Cited

U.S. PATENT DOCUMENTS

| 5,111,395 | A | 5/1992 | Smith et al. | |
|---|---|---|---|---|
| 6,167,405 | A * | 12/2000 | Rosensteel et al. | 707/102 |
| 6,381,601 | B1 * | 4/2002 | Fujiwara et al. | 707/7 |
| 2003/0037051 | A1 * | 2/2003 | Gruenwald | 707/7 |
| 2005/0039119 | A1 | 2/2005 | Parks et al. | |
| 2005/0131902 | A1 * | 6/2005 | Saika | 707/10 |

OTHER PUBLICATIONS

Bill Camarda, Special Edition Using Microsoft Word 2002, Published Jun. 18, 2001; Chapter 18 Section 5; pp. 1-12.*
Bill Camarda, Special Edition Using Microsoft Word 2002, Published Jun. 18, 2001; Overview (contains proof of publish date); pp. 1-4.*
European Search Report mailed Dec. 16, 2008 cited in App. No. EP 05 10 8491.
Lisa Wollin: "Extending Mail Merge Features" Word 2002 Technical Articles, the whole document.
Anonymous: "MerlinMerge SpeedPro Software Use" Aug. 5, 2004, the whole document.
Anonymous: "Formativ Applet: Import Excel Data into an Address Book", Sep. 24, 2002, the whole document.
Hernandez et al.: "The merge/purge problem for large databases", SIGMOD Records, ACM, New York, NY, US, vol. 24, No. 2, Jun. 1, 1995, pp. 127-138.

* cited by examiner

*Primary Examiner*—John E Breene
*Assistant Examiner*—Alex Gofman
(74) *Attorney, Agent, or Firm*—Merchant & Gould; Ryan T. Grace

(57) ABSTRACT

A method, apparatus, and computer-readable medium are provided for merging data from multiple data sources for use in an electronic document. The method includes receiving field names and field data from an initial data source, mapping field names from a subsequently added data source to the initial data source, building a recipient list schema based on the field names from the initial data source and the mapped field names from the subsequently added data source, creating a recipient list according to the recipient list schema, and saving the recipient list to a file. The recipient list schema defines the relationships between the field names in the recipient list and the field names in the initial and subsequently added data sources.

13 Claims, 6 Drawing Sheets

METHOD, SYSTEM, AND COMPUTER-READABLE MEDIUM FOR MERGING DATA FROM MULTIPLE DATA SOURCES FOR USE IN AN ELECTRONIC DOCUMENT

BACKGROUND OF THE INVENTION

Modern desktop publishing applications enable a user to readily create electronic documents. One feature available in many desktop publishing applications for creating electronic documents is known as "mail merge." Mail merge automates the process of creating variable data documents by allowing users to connect to and merge data from a single data source. In utilizing the mail merge feature, data is pulled from a single data source (such as a mailing list) and inserted at marked locations in a document.

One drawback associated with the mail merge feature offered by modern desktop publishing applications is that users often store data (such as mailing lists) in disparate formats and in multiple locations in a computer system. For instance, a user may store one list of contacts as a contacts file which is readable by a contact manager program while another list of contacts may be stored as a spreadsheet file which is readable by a spreadsheet program. Thus, users are often required to assemble data in disparate formats from multiple sources into a single data source to utilize the mail merge feature offered by desktop publishing applications.

It is with respect to these considerations and others that the various embodiments of the present invention have been made.

BRIEF SUMMARY OF THE INVENTION

In accordance with the present invention, the above and other problems are solved by a method, system, and computer-readable medium for merging data from multiple data sources for use in an electronic document. According to one aspect of the invention, the method includes receiving field names and field data from an initial data source, mapping field names from a subsequently added data source to the initial data source, and building a recipient list schema based on the field names from the initial data source and the mapped field names from the subsequently added data source. The recipient list schema defines the relationships between the field names in the recipient list and the field names in the initial and subsequently added data sources. The building of the recipient list includes comparing the mapped field names from the subsequently added data source to the field names from the initial data source and, if any of the mapped field names from the subsequently added data source do not correspond to the field names from the initial data source, then the method includes adding the mapped field names.

The method further includes creating a recipient list according to the recipient list schema, and saving a file that allows for the recipient list to be re-created. The creation of the recipient list according to the recipient list schema may include adding rows of field data from the subsequently added data source to a temporary recipient list to create a master data source and calculating a hash value for each row of field data in the master data source. The saved updated recipient list file may include a reference to the initial data source, a reference to the subsequently added data source, and the hash value calculated for each of the rows of field data in the master data source. The method may further include modifying the recipient list to modify the field data in the initial data source and the field data in the subsequently added data source and resolving duplicates between the initial data source and the subsequently added data source in the recipient list.

The invention may be implemented as a computer process, a computing system, or as an article of manufacture such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features, as well as advantages, which characterize the present invention, will be apparent from a reading of the following detailed description and a review of the associated drawings.

DETAILED DESCRIPTION OF THE INVENTION

Figure 1:
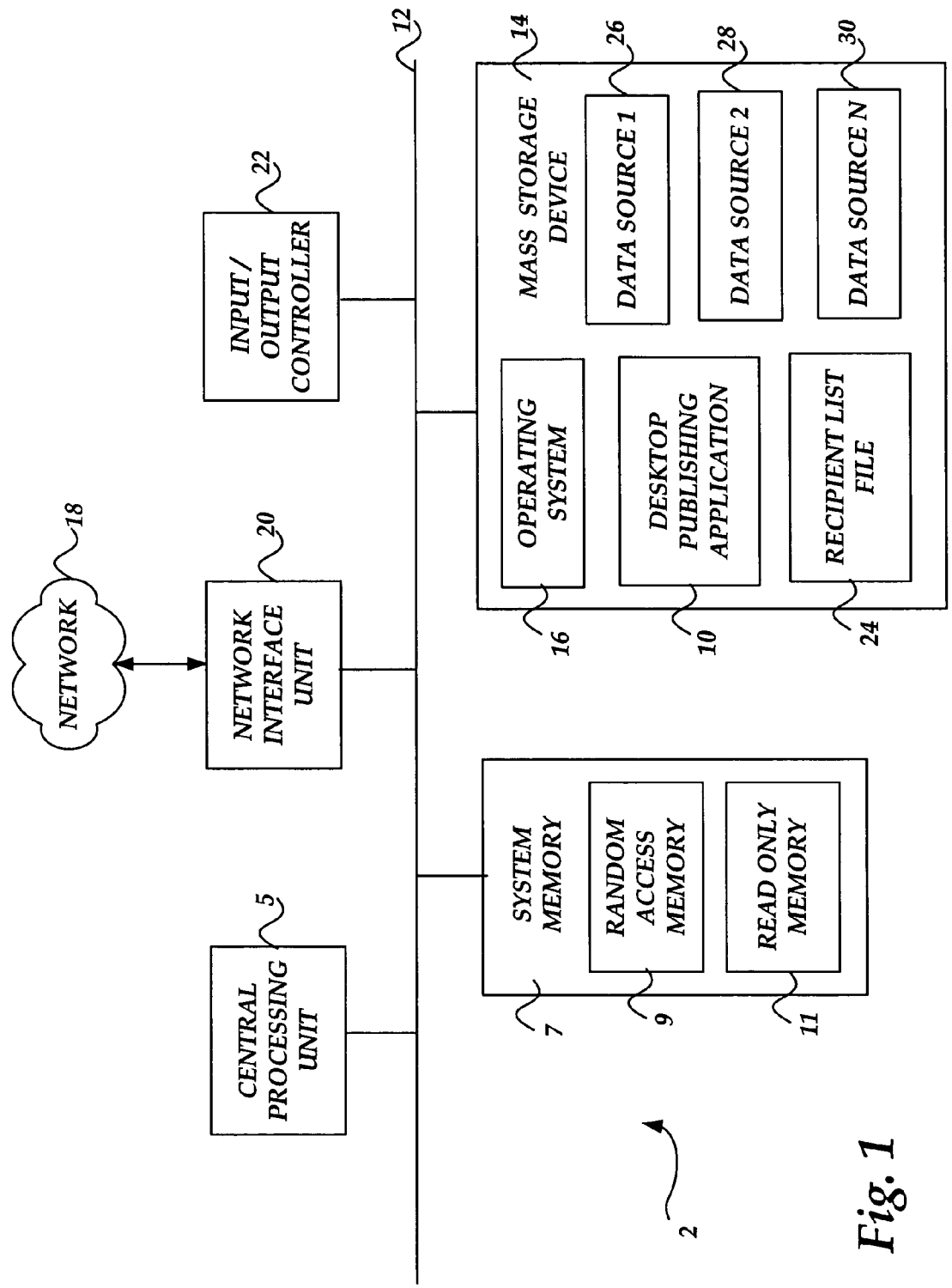
FIG. 1 is a computer system architecture diagram illustrating a computer system utilized in and provided by the various embodiments of the invention.

Referring now to the drawings, in which like numerals represent like elements, various aspects of the present invention will be described. In particular, FIG. 1 and the corresponding discussion are intended to provide a brief, general description of a suitable computing environment in which embodiments of the invention may be implemented. While the invention will be described in the general context of program modules that execute in conjunction with program modules that run on an operating system on a personal computer, those skilled in the art will recognize that the invention may also be implemented in combination with other types of computer systems and program modules.

Generally, program modules include routines, programs, components, data structures, and other types of structures that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote memory storage devices.

Referring now to FIG. 1, an illustrative computer architecture for a computer 2 utilized in the various embodiments of the invention will be described. The computer architecture shown in FIG. 1 illustrates a conventional desktop or laptop computer, including a central processing unit 5 ("CPU"), a system memory 7, including a random access memory 9

("RAM") and a read-only memory ("ROM") 11, and a system bus 12 that couples the memory to the CPU 5. A basic input/output system containing the basic routines that help to transfer information between elements within the computer, such as during startup, is stored in the ROM 11. The computer 2 further includes a mass storage device 14 for storing an operating system 16, application programs, and other program modules, which will be described in greater detail below.

The mass storage device 14 is connected to the CPU 5 through a mass storage controller (not shown) connected to the bus 12. The mass storage device 14 and its associated computer-readable media provide non-volatile storage for the computer 2. Although the description of computer-readable media contained herein refers to a mass storage device, such as a hard disk or CD-ROM drive, it should be appreciated by those skilled in the art that computer-readable media can be any available media that can be accessed by the computer 2.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 2.

According to various embodiments of the invention, the computer 2 may operate in a networked environment using logical connections to remote computers through a network 18, such as the Internet. The computer 2 may connect to the network 18 through a network interface unit 20 connected to the bus 12. It should be appreciated that the network interface unit 20 may also be utilized to connect to other types of networks and remote computer systems. The computer 2 may also include an input/output controller 22 for receiving and processing input from a number of other devices, including a keyboard, mouse, or electronic stylus (not shown in FIG. 1). Similarly, an input/output controller 22 may provide output to a display screen, a printer, or other type of output device.

As mentioned briefly above, a number of program modules and data files may be stored in the mass storage device 14 and RAM 9 of the computer 2, including an operating system 16 suitable for controlling the operation of a networked personal computer, such as the WINDOWS XP operating system from MICROSOFT CORPORATION of Redmond, Wash. The mass storage device 14 and RAM 9 may also store one or more program modules. In particular, the mass storage device 14 and the RAM 9 may store a desktop publishing application 10. As known to those skilled in the art, the desktop publishing application 10 is operative to provide functionality for creating and editing electronic documents. According to one embodiment of the invention, the desktop publishing application 10 comprises the PUBLISHER word processing application program from MICROSOFT CORPORATION. It should be appreciated, however, that desktop publishing applications from other manufacturers may be utilized to embody the various aspects of the present invention. It should further be appreciated that the various aspects of the present invention are not limited to desktop publishing applications but may also utilize other programs which are capable of processing text, such as the WORD program from MICROSOFT CORPORATION as well as spreadsheet programs and database programs.

In conjunction with the creation of a, the desktop publishing application 10 provides functionality for allowing a user to merge data sources 26 (Data Source 1), 28 (Data Source 2), and 30 (Data Source N) into various locations of an electronic document. It will be appreciated that the each of the data sources 26, 28, and 30 may be a list or table of data divided into one or more fields. For instance, a data source may store contact information including names, companies, and addresses in data fields "Last Name," "First Name," "Title," "Company Name," and "Address." It should be understood that in merging multiple data sources, the desktop publishing application 10 creates a recipient list file 24 for storing the merged data. An illustrative method utilized by the desktop publishing application 10 for merging the data sources 26 (Data Source 1), 28 (Data Source 2), and 30 (Data Source N) to create the recipient list file 24 will be described in greater detail with respect to FIG. 2, below.

Figure 2:
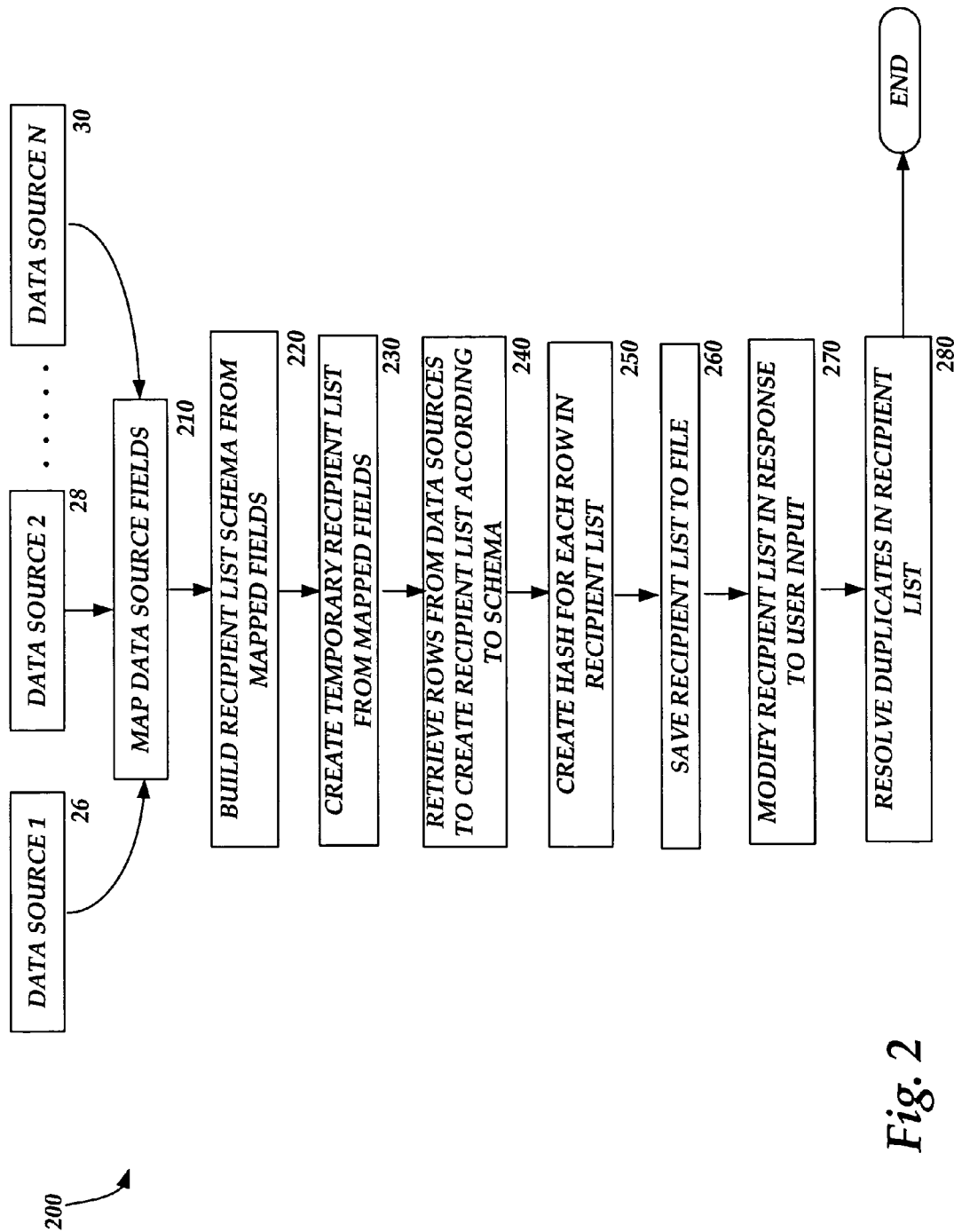
FIG. 2 is an illustrative routine performed by a desktop publishing application in the computer system of FIG. 1 for merging data from multiple data sources, according to an illustrative embodiment of the invention.

Referring now to FIG. 2, an illustrative routine 200 will be described illustrating a process performed by the desktop publishing application 10 for merging data from multiple data sources. It should be appreciated that although the embodiments of the invention described herein are presented in the context of the desktop publishing application 10, the invention may be utilized in other types of application programs that support text processing, such as word processing, spreadsheet, and database programs.

When reading the discussion of the routines presented herein, it should be appreciated that the logical operations of various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated in FIG. 2, and making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims set forth herein.

Referring now to FIG. 2, the routine 200 begins at operation 210, wherein the desktop publishing application 10 receives data sources 26 (Data Source 1), 28 (Data Source 2), and 28 (Data Source N) and "maps" the fields in each of the data sources. In particular, in mapping the fields in each of the data sources, the desktop publishing application 10 may retrieve a first data source as an initial data source, associate fields from each subsequent retrieved data source with the fields of the initial data source, and add fields in the subsequent data source which do not appear in the initial data source. For instance, the data source 26 (Data Source 1) may include data fields "First Name," and "Last Name," while data source 28 (Data Source 2) may include data fields "First Name," "Last Name," and "Title." In mapping the data fields, the word processing application program may designate the data source 26 as the initial data source and map the common fields (i.e., "First Name" and "Last Name") shared by the data sources as well as add the unique field "Title" from the data source 28. It will be appreciated that in the various embodiments of the invention, a user of the desktop publishing application 10 may designate the fields from subsequent data sources (e.g., the data source 28) to be mapped or added to the initial data source. It will further be appreciated that that mapped fields may also be un-mapped.

The routine 200 continues from operation 210 to operation 220, where the desktop publishing application 10 builds a recipient list (i.e., a master data source) schema from the mapped fields from data sources 26, 28, and 30. As defined herein, a "schema" defines the field names mapped from each of the input data sources. For instance, a recipient list schema for the data source 26 and the data source 28 may include the fields "First Name," and "Last Name" (from the data sources 26 and 28) as well as the field "Title" (from the data source 28 only).

The routine 200 continues from operation 220 to operation 230 where the desktop publishing application 10 creates a temporary recipient list from the recipient list schema. In particular, the desktop publishing application 10 may create a table of fields from the recipient list schema to receive data associated with the fields from each of the input data sources. The routine 200 continues from operation 230 to operation 240 where the desktop publishing application 10 retrieves one or more rows of data from each of the input data sources to create a recipient list. In particular, the desktop publishing application 10 retrieves data from each data source and fills the temporary recipient list according to the recipient list schema.

The routine 200 continues from operation 240 to operation 250 where the desktop publishing application 10 creates a hash for each row in the recipient list. As is known to those skilled in the art, a hash is a number generated from a string of text which may be used to access data methods. The hash (or hash value) is generated by a formula in such a way that it is extremely unlikely that some other text will produce the same hash value. Various methods for generating hash values are well-known to those skilled in the art, and therefore not discussed in further detail herein. It will be appreciated that the hash serves as a link to data in the input data sources may be used to distinguish the merged data in the recipient list.

The routine 200 continues from operation 250 to operation 260 where the desktop publishing application 10 saves the recipient list to a file (such as the recipient list file 24). It will be appreciated that in saving the recipient list, a file is created which allows for the recipient list to be re-created. It will be further be appreciated that the recipient list file 24 may include a reference to the initial data source, a reference to each subsequent or added data source, and the hash value calculated for each of the rows of field data in the recipient list. The routine 200 continues from operation 260 to operation 270 where the desktop publishing application 10 modifies the recipient list in response to input from a user. In particular, a user may update data in the recipient list by changing or removing data. It will be appreciated that the modification in the recipient list also modifies the data in the supplying data source. For instance, a user modifying last name data in the recipient list retrieved from the data source 26 will result in the modification of the same last name data in the data source 26. It will be appreciated that in modifying data in the recipient list, the desktop publishing application 10 may reference the hash value calculated for each modified row of data in the recipient list to locate and update the corresponding data in the affected data sources.

The routine 200 continues from operation 270 to operation 280 where the desktop publishing application 10 resolves duplicate data in the recipient list. In particular, it will be appreciated that the data sources 26, 28, and 30 may include identical data which may show up as duplicate entries in the recipient list. For instance, a user may have name and address information for the same person listed in two different data sources.

It will be appreciated that in one embodiment, the desktop publishing application 10 may be configured to locate duplicate data entries by creating a hash table of the hash values from the recipient list and comparing the data entries which two hash values point to. In the various illustrative embodiments of the invention, duplicates may be found by comparing every row with every other row. The hash value calculated for each row is stored in memory. It should be understood that one hash value is stored for every column in every row. The hash values are then compared. When two data entries match their hash values will also match. When two rows satisfy predetermined duplicate rules (e.g., 75% of the data in two rows must match), they are loaded from the master data source and the actual data entries are compared by a user to determine if they are in fact duplicates of one another. The routine 200 then ends.

Figure 3:
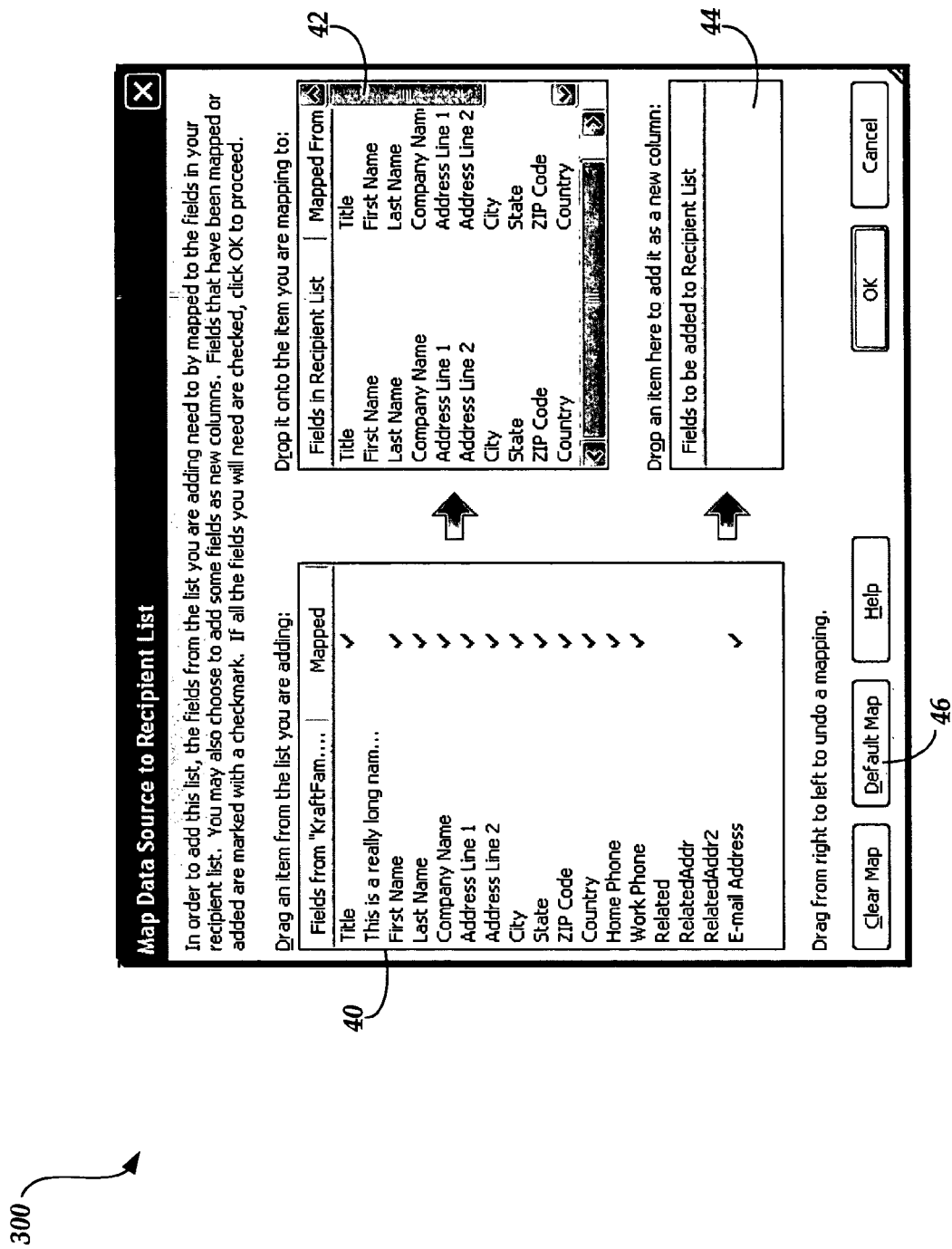
FIGS. 3-6 are screen diagrams illustrating an aspect of the invention for providing a facility through which a user may merge data and manage merged data from multiple data sources, according to the various embodiments of the invention.

Referring now to FIG. 3, an illustrative user interface will be described for allowing a user to map a data source to a recipient list schema. FIG. 3 shows a user interface window 300 including a number of user interface components for mapping fields from a data source. In particular, a window 40 displays fields from a data source which may be mapped to a recipient list schema by dragging them from the window 40 and dropping them into the field 42 or into the field 44. Fields added to the window 44 will be added as a new column in the recipient list schema. A mapping may be undone by dragging fields from the window 42 or 44 to the window 40. A default map button 46 is provided for selecting a default mapping of the fields from the data source which is automatically determined by the desktop publishing application 10.

Figure 4:
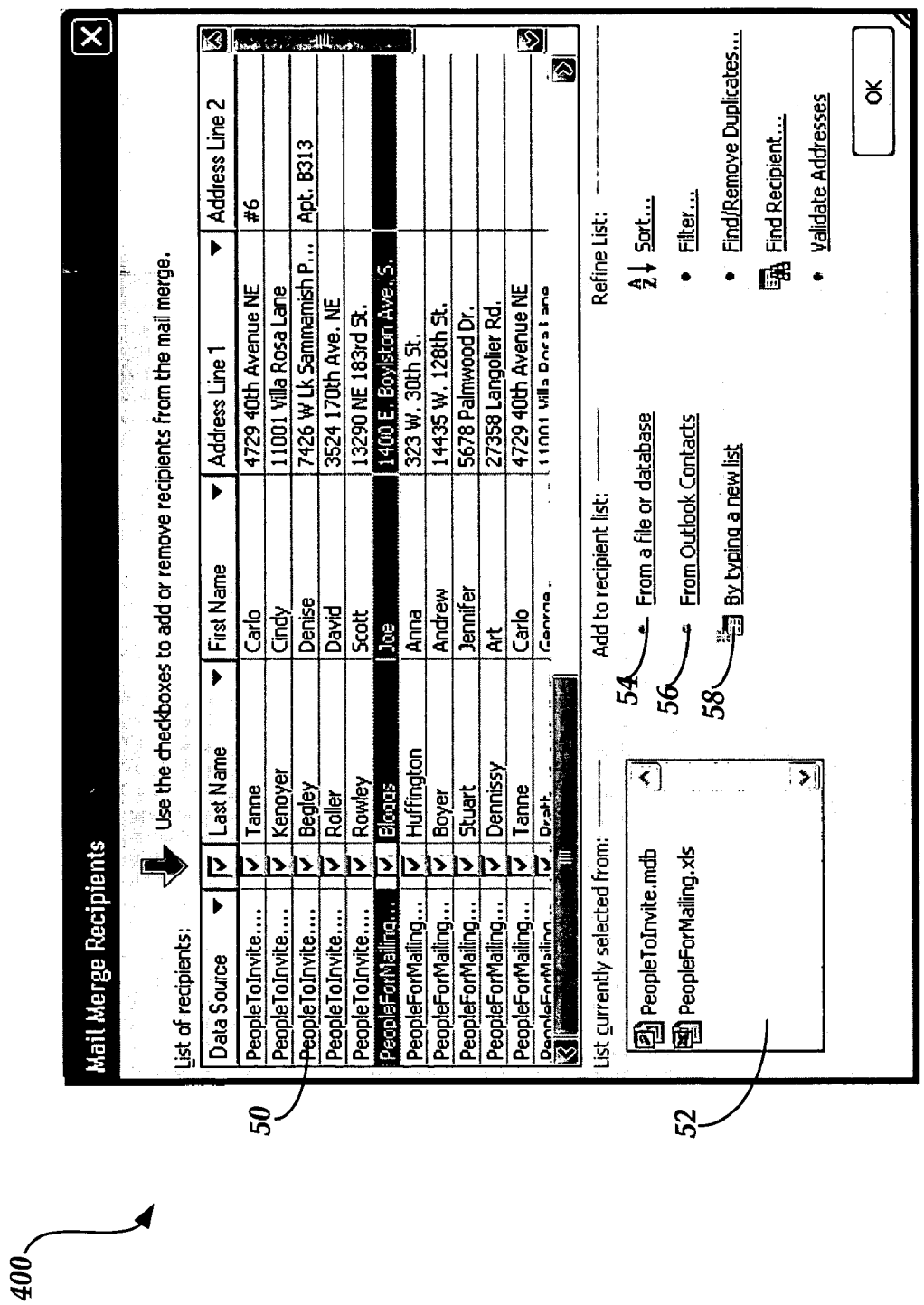

Referring now to FIG. 4, an illustrative user interface will be described which displays a recipient list created from two data sources. FIG. 4 shows a user interface window 400 displaying a recipient list along with rows of mapped fields and associated data. The window 52 identifies the data sources used to create the recipient list. Links 54 and 56 are provided for adding a data source to the recipient list from a file, database, or from a contacts list. Link 58 is provided for creating a data source by typing a new list.

Figure 5:
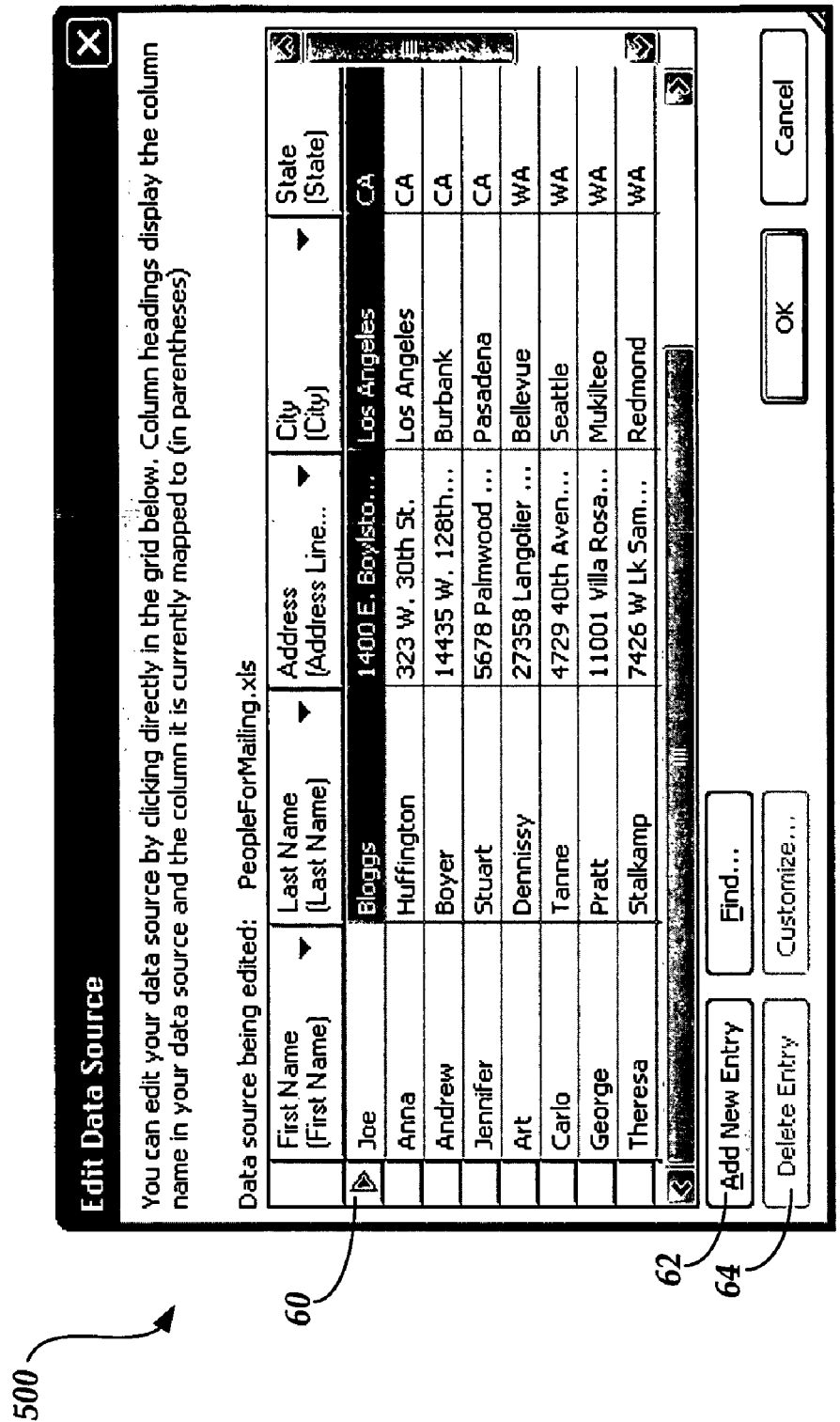

Referring now to FIG. 5, an illustrative user interface will be described for allowing a user to edit a data source. FIG. 5 shows a user interface window 500 displaying a data source table 60 along with rows of filed data. An add new entry button 62 is provided for adding a new entry to the data source table 60 and a delete entry button 64 is provided for deleting a displayed entry in the data source table 60. It will be appreciated that the user interface window 500 may include mapped data or copied data from a recipient list which is linked to an original data source stored in another location such that changes will be propagated back to the original data source.

Figure 6:
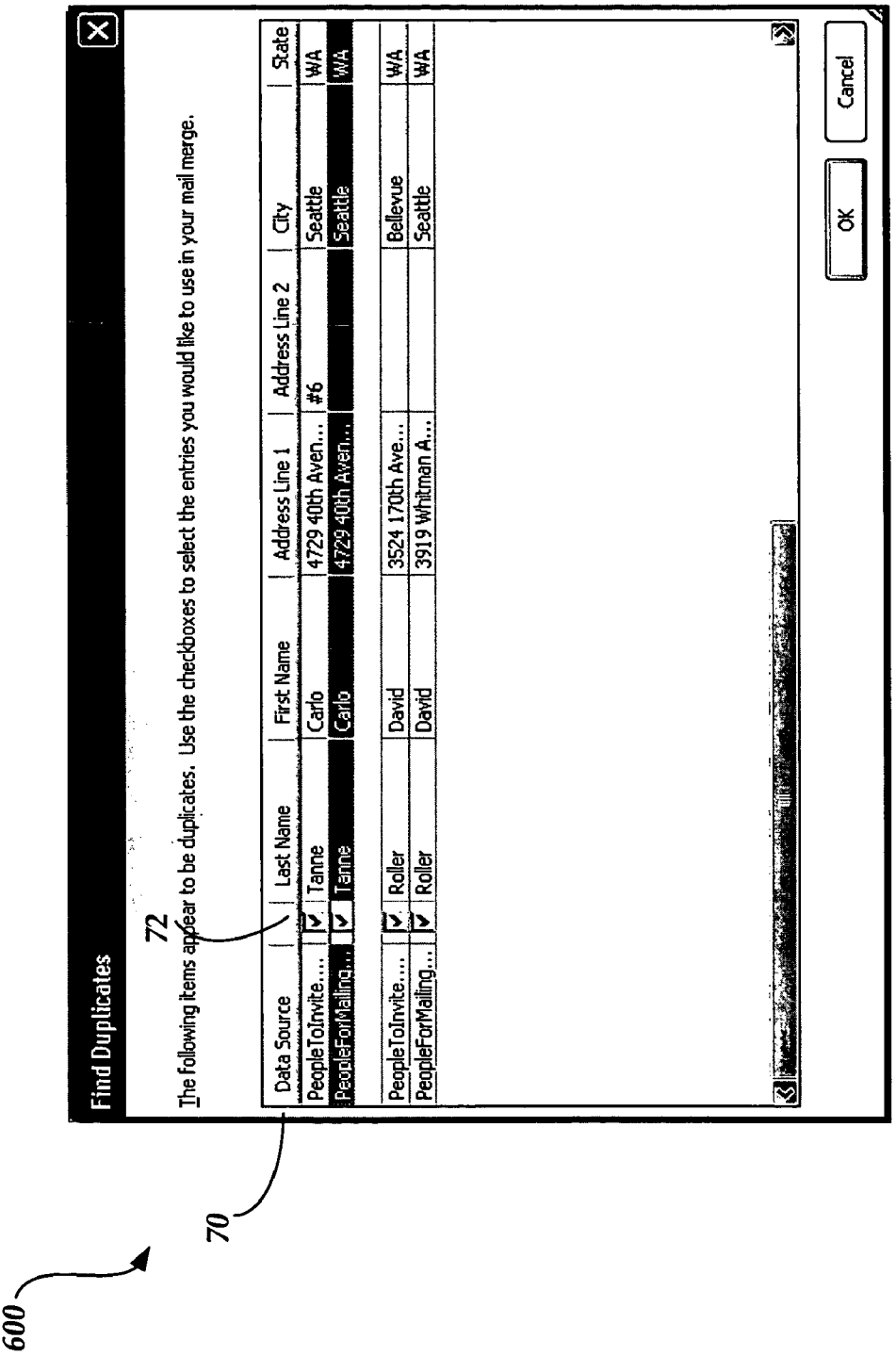

Referring now to FIG. 6, an illustrative user interface will be described for allowing a user to remove duplicates found in a recipient list by the desktop publishing application 10 as discussed above with respect to FIG. 2. FIG. 6 shows a user interface 600 displaying a data source table 70 listing duplicate data entries. A column of check boxes 72 is provided for allowing a user to select entries to be removed from the recipient list.

Based on the foregoing, it should be appreciated that the various embodiments of the invention include a method, system, and computer-readable medium for merging data from multiple data sources for use in an electronic document. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for merging contact data from a plurality of contact data sources for use in an electronic document, comprising:

forming a schema of mapped contact field names from at least two separate data sources, wherein forming of the schema includes:
  receiving previously stored contact field names from an initial contact data source;
  populating a first window user interface with a list of the contact field names from the initial contact data source;
  receiving previously stored contact field names from at least one subsequently added contact data source;
  populating a second window user interface with a list of contact field names from the at least one subsequently added contact data source;
  after population of the first and second window user interfaces, mapping contact field names to create a list of mapped contact field names in the first window user interface, wherein mapping contact field names includes mapping the contact field names of the second window user interface to the contact field names of the first window user interface; and
  forming the schema from the list of mapped contact field names in the first window user interface;
after the formation of the schema, generating a temporary recipient list from the schema, wherein the temporary recipient list includes the contact field names generated in accordance with the schema and value fields for receiving values from the initial contact data source and the at least one subsequently added contact data source;
after the generation of the temporary recipient list, causing a processor to populate the value fields with values from the initial data source and the at least one subsequently added contact data source, wherein the values are associated with source identifiers indicating the source of the values;
after the generation of a populated recipient list, displaying the populated recipient list in an edit user interface;
receiving an edit to at least one of the values of the populated recipient list;
based on a source identifier association with the at least one value that received the edit, synchronizing the edit to at least one member of a group comprising: the initial contact data source and the at least one subsequently added contact data source;
creating a hash value for each row of the populated contact recipient list, wherein each hash value facilitates the determination of duplication between any row of the populated contact recipient list;
determining whether a hash value match exists between any of the rows of the populated contact recipient list, wherein determining whether a hash value match exists between any of the rows of the populated contact recipient list includes determining whether a hash value match exists according to a predetermined duplicate rule that includes a predetermined value match threshold to cause the match;
when a hash value match exists, populating a duplication window user interface with rows of the populated contact recipient list having matching hash values and resolving duplicative rows of the populated contact recipient list via the duplication window user interface; and
saving the resolved populated contact recipient list to a file.

2. The method of claim 1, wherein forming a schema based on the mapped contact field names in the first window user interface comprises:
  comparing the mapped contact field names from the at least one subsequently added contact data source to the contact field names from the initial contact data source; and
  if any of the mapped contact field names from the at least one subsequently added contact data source do not correspond to the contact field names from the initial contact data source, then adding the mapped contact field names.

3. The method of claim 1, wherein determining whether a hash value match exists between any of the rows of the populated contact recipient list includes creating a hash table of hash values associated with each of the rows and comparing values of each row that the hash values point to.

4. The method of claim 1, wherein resolving duplicative rows via the duplication window includes receiving an input to indicate that a row includes a match and removing the row from the populated contact recipient list to generate the resolved populated contact recipient list.

5. A system for merging data from a plurality of data sources for use in an electronic document, comprising:
  a processor; and
  a memory having computer executable instructions stored thereon, wherein the computer executable instructions are configured for:
    forming a schema of mapped contact field names from at least two separate data sources, wherein forming of the schema includes:
      receiving previously stored contact field names from an initial contact data source;
      populating a first window user interface with a list of the contact field names from the initial contact data source;
      receiving previously stored contact field names from at least one subsequently added contact data source;
      populating a second window user interface with a list of contact field names from the at least one subsequently added contact data source;
      after population of the first and second window user interfaces, mapping contact field names to create a list of mapped contact field names in the first window user interface, wherein mapping contact field names includes mapping the contact field names of the second window user interface to the contact field names of the first window user interface; and
      forming the schema from the list of mapped contact field names in the first window user interface;
    after the formation of the schema, generating a temporary recipient list from the schema, wherein the temporary recipient list includes the contact field names generated in accordance with the schema and value fields for receiving values from the initial contact data source and the at least one subsequently added contact data source;
    after the generation of the temporary recipient list, causing a processor to populate the value fields with values from the initial data source and the at least one subsequently added contact data source, wherein the values are associated with source identifiers indicating the source of the values;

after the generation of a populated recipient list, displaying the populated recipient list in an edit user interface;

receiving an edit to at least one of the values of the populated recipient list;

based on a source identifier association with the at least one value that received the edit, synchronizing the edit to at least one member of a group comprising: the initial contact data source and the at least one subsequently added contact data source;

creating a hash value for each row of the populated contact recipient list, wherein each hash value facilitates the determination of duplication between any row of the populated contact recipient list;

determining whether a hash value match exists between any of the rows of the populated contact recipient list, wherein determining whether a hash value match exists between any of the rows of the populated contact recipient list includes determining whether a hash value match exists according to a predetermined duplicate rule that includes a predetermined value match threshold to cause the match; and when a hash value match exists, populating a duplication window user interface with rows of the populated contact recipient list having matching hash values and resolving duplicative rows of the populated contact recipient list via the duplication window user interface.

6. The system of claim 5, wherein forming a schema based on the mapped contact field names in the first window user interface comprises:

comparing the mapped field names from the at least one subsequently added data source to the field names from the initial data source; and if any of the mapped field names from the at least one subsequently added data source do not correspond to the field names from the initial data source, then adding the mapped field names.

7. The system of claim 5, wherein the computer executable instructions are configured for saving the recipient list to a file, wherein saving the recipient list to a file comprises saving a file which allows for the recipient list to be re-created.

8. The system of claim 5, wherein determining whether a hash value match exists between any of the rows of the populated recipient list includes creating a hash table of hash values associated with each of the rows and comparing values of the rows that the hash values point to.

9. The system of claim 5, wherein resolving duplicative rows via the duplication window includes receiving an input to indicate that a row includes a match and removing the row from the populated recipient list to generate the resolved populated recipient list.

10. A computer-readable storage medium having computer-executable instructions stored thereon which, when executed by a computer, will cause the computer to perform a method for merging data from a plurality of data sources for use in an electronic document, the method comprising:

forming a schema of mapped contact field names from at least two separate data sources, wherein forming of the schema includes:

receiving previously stored field names from an initial data source;

populating a first window user interface with a list of the field names from the initial data source;

receiving previously stored field names from at least one subsequently added data source;

populating a second window user interface with a list of field names from the at least one subsequently added data source;

after population of the first and second window user interfaces, mapping field names to create a list of mapped field names in the first window user interface, wherein mapping field names includes mapping the field names of the second window user interface to the field names of the first window user interface; and forming the schema from the list of mapped field names in the first user interface window;

after the formation of the schema, generating a temporary recipient from the schema, wherein the temporary recipient list includes the contact field names generated in accordance with the schema and value fields for receiving values form the initial contact data source and the at least one subsequently added contact data source;

after the generation of the temporary recipient list, causing a processor to populate the value fields with values from the initial data source and the at least one subsequently added contact data source, wherein the values are associated with source identifiers indicating the source of the values;

after the generation of a populated recipient list, displaying a the populated recipient list in an edit user interface;

creating a hash value for each row of the populated recipient list, wherein each hash value facilitates the determination of duplication between any row of the populated contact recipient list;

determining whether a hash value match exists between any of the rows of the populated recipient list, wherein determining whether a hash value match exists between any of the rows of the populated contact recipient list includes determining whether a hash value match exists according to a predetermined duplicate rule that includes a predetermined value match threshold to cause the match;

when a hash value match exists, populating a duplication window user interface with rows of the populated contact recipient list having matching hash values and resolving duplicative rows of the populated contact recipient list via the duplication window user interface; and saving the resolved populated recipient list to a file.

11. The computer readable storage medium of claim 10, wherein forming a schema based on the mapped field names in the first window user interface comprises:

comparing the mapped field names from the at least one subsequently added data source to the field names from the initial data source; and if any of the mapped field names from the at least one subsequently added data source do not correspond to the field names from the initial data source, then adding the mapped field names.

12. The computer-readable storage medium of claim 10, wherein determining whether a hash value match exists between any of the rows of the populated recipient list includes creating a hash table of hash values associated with each of the rows and comparing values of the rows that the hash values point to.

13. The computer-readable storage medium of claim 10, wherein resolving duplicative rows via the duplication window includes receiving an input to indicate that a row includes a match and removing the row from the populated recipient list to generate the resolved populated recipient list.

* * * * *

UNITED STATES PATENT AND TRADEMARK OFFICE
CERTIFICATE OF CORRECTION

| | | |
|---|---|---|
| PATENT NO. | : 7,739,309 B2 | Page 1 of 1 |
| APPLICATION NO. | : 10/955433 | |
| DATED | : June 15, 2010 | |
| INVENTOR(S) | : Sumi N. Singh et al. | |

It is certified that error appears in the above-identified patent and that said Letters Patent is hereby corrected as shown below:

Column 10, line 26, in Claim 10, before "the" delete "a".

Signed and Sealed this
Eighth Day of February, 2011

David J. Kappos
*Director of the United States Patent and Trademark Office*